United States Patent
Agle et al.

(10) Patent No.: US 8,543,444 B2
(45) Date of Patent: Sep. 24, 2013

(54) METHOD AND SYSTEM FOR ASSESSING COMPLIANCE RISK OF REGULATED INSTITUTIONS

(71) Applicant: NeighborBench LLC, Rockville, MD (US)

(72) Inventors: Kenneth Price Agle, Mapleton, UT (US); Robert Patrick Ryan, Timonium, MD (US); Ken Wolff, Rockville, MD (US)

(73) Assignee: Neighborbench LLC, Rockville, MD (US)

( * ) Notice: Subject to any disclaimer, the term of this patent is extended or adjusted under 35 U.S.C. 154(b) by 0 days.

(21) Appl. No.: 13/743,813

(22) Filed: Jan. 17, 2013

(65) Prior Publication Data

US 2013/0132150 A1     May 23, 2013

Related U.S. Application Data

(63) Continuation-in-part of application No. 13/278,627, filed on Oct. 21, 2011.

(51) Int. Cl.
    *G06F 17/00*       (2006.01)

(52) U.S. Cl.
    USPC ............................................. 705/7.28

(58) Field of Classification Search
    USPC ............................................. 705/7.28
    See application file for complete search history.

(56) References Cited

U.S. PATENT DOCUMENTS

| | | | |
|---|---|---|---|
| 7,260,584 B2 | 8/2007 | Hailey et al. | |
| 7,472,345 B2 | 12/2008 | Hailey et al. | |
| 7,496,840 B2 | 2/2009 | Hailey et al. | |
| 2002/0059093 A1 | 5/2002 | Barton et al. | |
| 2008/0033775 A1 | 2/2008 | Dawson et al. | |
| 2008/0263505 A1 | 10/2008 | StClair et al. | |

(Continued)

FOREIGN PATENT DOCUMENTS

| | | |
|---|---|---|
| JP | 2008-084020 A | 4/2008 |
| KR | 10-2009-0039128 A | 4/2009 |

OTHER PUBLICATIONS

MediRegs ComplyTrack Suite, "A Powerful, secure Solution designed to drive compliance that is completely in-sync with your risk-management processes and enforces standards across every function of your enterprise" Wolters Kluwer Law & Business, 2011, (1 page).

(Continued)

*Primary Examiner* — Thomas Dixon
(74) *Attorney, Agent, or Firm* — Buchanan Ingersoll & Rooney PC

(57) ABSTRACT

A system and method for assessing compliance risk of a regulated institution. Data on a plurality of regulated institutions is extracted from publicly available sources and stored in an extracted information database. A client questionnaire is created and separated into a plurality of role categories. A list of employees and their area of responsibility is obtained from a client regulated institution. The client questionnaire is distributed to the employees, each employee receiving questions from a role category based on their area of responsibility. Answers are stored in a client questionnaire database. Data on the client regulated institution is located in the extracted information database. Then, based on the questionnaire answers and extracted data, the risk that the client regulated institution will not be compliant with a set of regulations is assessed.

24 Claims, 5 Drawing Sheets

(56) References Cited

U.S. PATENT DOCUMENTS

| | | |
|---|---|---|
| 2009/0228337 A1 | 9/2009 | Swindon et al. |
| 2009/0319420 A1 | 12/2009 | Sanchez et al. |
| 2010/0004981 A1* | 1/2010 | Katz et al. .................. 705/11 |
| 2012/0030251 A1 | 2/2012 | Alfredson |

OTHER PUBLICATIONS

MediRegs ComplyTrack Activity & Event Manager, "Track and manager issues, projects and meetings completely and securely across the enterprise" Wolters Kluwer Law & Business, 2011, (1 page).

MediRegs ComplyTrack Audit Detail Manager, "Proactively manage all facets of the claims-based audit process" Wolters Kluwer Law & Business, 2011, (1 page).

MediRegs ComplyTrack Contract & Relationship Manager, "Effectively monitor and manage all your contractual and arm's-length relationships across the enterprise" Wolters Kluwer Law & Business, 2011, (1 page).

MediRegs ComplyTrack Incident Reporter, "Proactively support your organization's incident reporting process" Wolters Kluwer Law & Business, 2011, (1 page).

MediRegs ComplyTrack Risk Assessment Manager, "Assess, interpret and remediate risk across your entire enterprise" Wolters Kluwer Law & Business, 2011, (1 page).

MediRegs ComplyTrack Survey Manager, "Capture and manage compliance evidence with a sophisticated, comprehensive, and customizable tool that puts you securely in control of annual survey needs" Wolters Kluwer Law & Business, 2011, (1 page).

MediRegs ComplyTrack Document & Policy Manager, "Create, manage, and distribute documents while maintaining strict control across the enterprise" Wolters Kluwer Law & Business, 2011, (1 page).

Continuity Control, "The Only Complete Compliance Platform for Community Financial Institutions" Continuity Control, 2012, (7 pages).

International Search Report mailed Mar. 27, 2013, in corresponding International Application No. PCT/US2012/061045, 11 pages.

* cited by examiner

METHOD AND SYSTEM FOR ASSESSING COMPLIANCE RISK OF REGULATED INSTITUTIONS

FIELD OF THE INVENTION

The present disclosure relates methods for assessing and managing risk in a financial institution associated with compliance. In particular, this disclosure relates to assessing and managing risk for an institution to be compliant with a set of regulations, and providing policies and procedures to follow to achieve or maintain compliance, including providing notifications to the institution.

BACKGROUND OF THE INVENTION

In recent years, various institutions and other organizations have experienced heightened regulatory scrutiny, negative media attention, reputational damage, legal liability, and other sanctions for violations of compliance obligations. This, in turn, has given rise to an increased attention by regulators and the corresponding regulated institutions on the role of compliance. In addition, regulators have required these institutions to increase the amount of resources they devote to compliance risk management.

Compliance risk management has become more challenging as the number of compliance obligations has proliferated. For example, in the financial industry, regulations have expanded and increased the number of compliance obligations. Examples of proliferating regulators in the financial industry include the Anti-Money Laundering and Counter-Terrorist Financing Obligations of the USA PATRIOT ACT, the Bank Secrecy Act, and the Right to Financial Privacy Act. This has led to a number of regulated institutions employing a number of employees dedicated to ensuring that the institution is compliant with regulations. Conversely, some institutions choose to pay outside providers for assistance with compliance, incurring substantial costs in the process. For smaller institutions, such as many locally owned and operated small businesses, the time and expense necessary to employ full-time compliance personnel or hire an outside provider and keep up-to-date with regulations can be staggering. Even for larger businesses that may be able to afford employing full-time compliance personnel, the amount of work necessary to maintain compliance can be staggering without additional assistance.

Institutions have a need to better and more systematically manage their compliance obligations. This has proven difficult, as demonstrated by the large number of enforcement actions that have been brought in recent years against institutions and other organizations for failure to manage compliance risk. Current methods of managing compliance risk relate to using questionnaires and/or databases to summarize and assess risk based on information provided by the institution. This process makes it difficult for an institution to properly assess risk and, once risk is assessed, not only make changes to become compliant but to also ensure that the institution stays compliant and facilitates regulator visits. Other current methods of managing compliance risk relate to having onsite personnel review documents, policies, and procedures by using checklists and developing recommendation reports. Such a process is difficult for many institutions to implement, due to the expense and logistics involved with accommodating onsite personnel. These processes also suffer from a lack of communication and involvement with the institution itself.

What is missing from current approaches to compliance risk management is a method for assessing compliance risk that uses information from both publicly available sources and key employees of the institution to assess risk and also create a plan of policies and procedures for the institution to follow. Thus, a need exists for a system for assessing compliance risk using information from a publicly available source as well as information from a client questionnaire that is separated into role categories and answered by employees with areas of responsibility corresponding to the role categories.

SUMMARY OF THE INVENTION

Systems and methods for assessing and managing compliance risk of a financial institution are disclosed herein.

It is noted initially that, as used herein, the term "institution" can include, for example, a bank (e.g., a national banks or a federal savings bank), a credit union, or any other institution that provides financial services for its clients or members (e.g., trust companies, mortgage loan companies, insurance companies, investment funds, etc.), a pharmaceutical company, a large drug manufacturer, research institutions or laboratories, investment institutions, or any other legal entity that is heavily regulated by a single or by multiple regulatory agencies or authorities. It is also noted that "regulation" refers to any form of regulation or supervision that an institution may be subject to. It can include, for example, governmental regulations (e.g., local, state, or federal) or non-governmental regulations, such as those imposed by a national association or the institution itself.

Exemplary embodiments of the present disclosure provide an advantageous feature by which an institution can achieve or maintain compliance with a set of regulations. A risk rating is assessed for an institution based on data obtained from publicly available sources and employee-given response to a questionnaire. Based on the assessed risk, a set of policies and procedures is created for the institution to implement in order to achieve or maintain compliance, and the institution is notified of the required policies and procedures. Media generated when the institution follows the policies and procedures is analyzed to reassess risk and update the necessary policies and procedures to be followed.

According to an exemplary embodiment, the present disclosure provides a method of assessing compliance risk of a regulated institution. Data on a plurality of regulated institutions is extracted from publicly available sources and stored in an extracted information database. A client questionnaire is created and separated into a plurality of role categories. A list of employees and a role category that corresponds to their individual area of responsibility is obtained from a client regulated institution. The client questionnaire is distributed to the employees, with each employee receiving questions based on their role category. Their answers are stored in a client questionnaire database. Data on the client regulated institution is located in the extracted information database and stored in the client questionnaire database. Then, based on the answers and data in the client questionnaire database, the risk that the client regulated institution will not be compliant with a set of regulations is assessed.

In another exemplary embodiment, the client regulated regulated institution is assigned a risk rating value based on their assessed risk. A set of policies and procedures for the client regulated institution to achieve and/or maintain compliance is generated based on the risk rating value, and stored in a client policy and procedures database. The client regulated institution is notified of any actions it is required to perform based on the set of policies and procedures. Any media generated by the performance of the required actions is stored in a client compliance database, and analyzed for compliance with the set of regulations. The client questionnaire database is updated based on the media stored in the client compliance database, and the risk assessment is preformed again using the updated data. The set of policies and procedures stored in the client policy and procedures database is updated based on the new risk assessment. Additional notifications are provided to the client regulated institution based on the new set of policies and procedures where applicable.

These and other features of the present disclosure will be readily appreciated by one of ordinary skill in the art from the following detailed description of various implementations when taken in connection with the accompanying drawings.

BRIEF DESCRIPTION OF THE DRAWING FIGURES

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Figure 1:
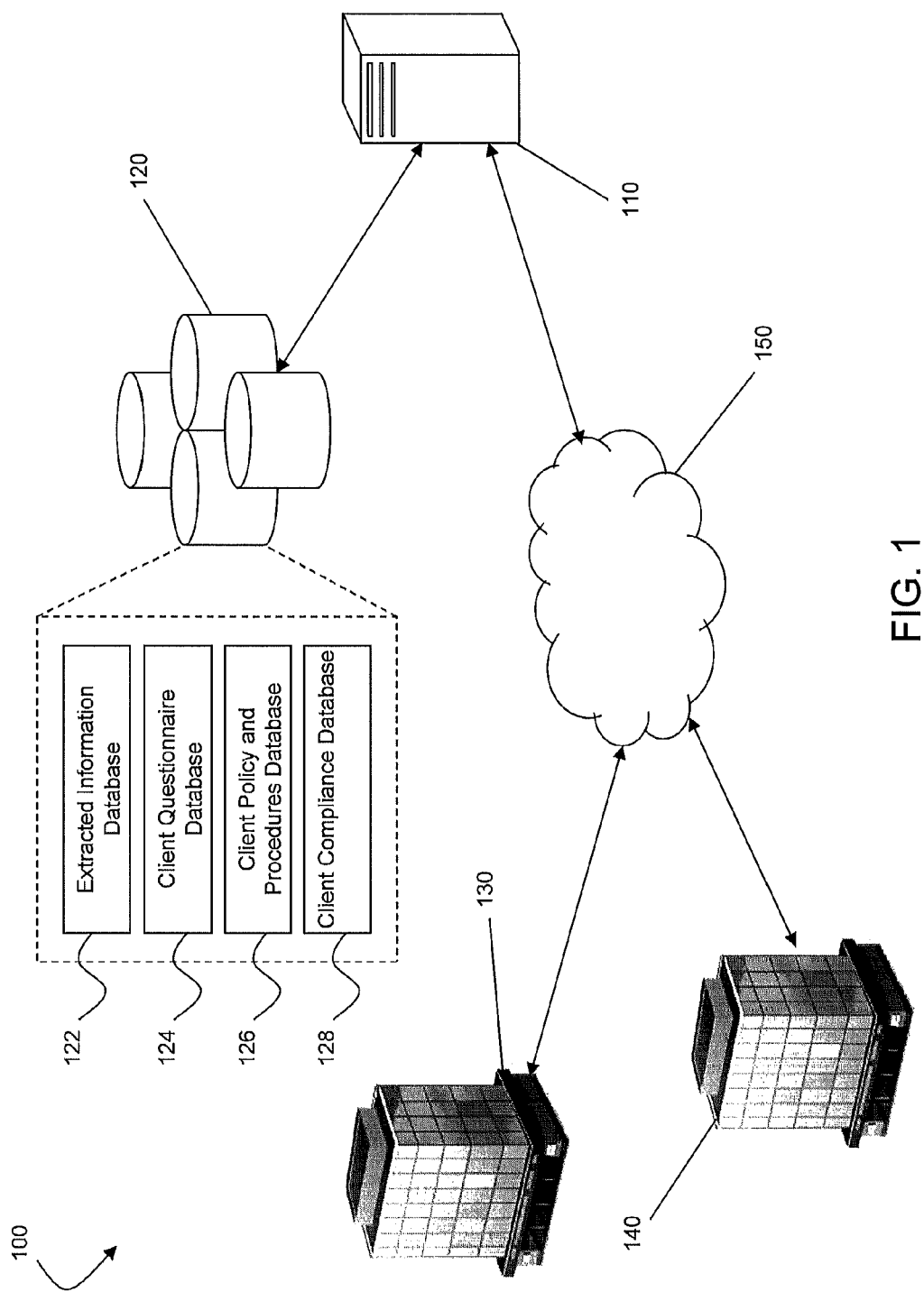
FIG. 1 is a block diagram illustrating components of a system for assessing compliance risk according to an embodiment of the disclosed system.

FIG. 1 is a block diagram illustrating components of a system 100 for assessing compliance risk according to an embodiment of the disclosed system. The system 100 includes a computer processing device 110, a plurality of databases 120, a client institution 130, and a source of publicly available information 140. The computer processing device 110, the client institution 130, and the publicly available source 140 are each connected via the network 150. The network 150 can be any suitable network configured to perform the features as disclosed herein. Suitable networks include, but are not limited to, a wide area network (WAN), local area network (LAN), the Internet, wireless network, landline, cable line, fiber-optic line, etc.

The computer processing device 110 is implemented in the system 100 for assessing the compliance risk of client institution 130. The computer processing device 110 is configured to have a communication path to and from the network 150. Types of communication paths utilized will be apparent to persons having skill in the relevant art(s). The computer processing device 110 is also configured to perform the functions additional functions as described below. The types of processing devices suitable for use as the computer processing device 110 include any device configured to perform the functions as discussed herein and will be apparent to persons having skill in the relevant art(s). For example, the computer processing device 110 can be a personal computer (PC), a server, or a plurality of servers.

The computer processing device 110 is connected to a plurality of databases 120. In FIG. 1 the connection between the computer processing device 110 and plurality of databases 120 is illustrated as being a serial connection. It will be apparent to persons having skill in the art that the connection can be performed in additional ways. For example, in one embodiment, the computer processing device 110 and plurality of databases 120 are connected through the network 150. The plurality of databases includes an extracted information database 122, client questionnaire database 124, client policy and procedures database 126, and client compliance database 128. It will be apparent to persons having skill in the art that these databases can be separate databases, or can all be implemented as a single database, either virtually or physically. Furthermore, the plurality of databases 120, while being illustrated in FIG. 1 as being external to computer processing device 110, can, in alternative embodiments, be implemented within the computer processing device 110. The type of database used may include a relational database management system (RDBMS). Methods of storing and accessing the information in the database will be apparent to persons having skill in the relevant art(s). For example, a query language can be used (e.g., Standardized Query Language (SQL) or QUEL).

The computer processing device 110 is configured to communicate with the publicly available source 140 via the network 150. The publicly available source 140 contains information on a plurality of regulated institutions. The publicly available source can include regulatory agencies (e.g., the Federal Deposit Insurance Corporation (FDIC) or National Credit Union Administration (NCUA), for example. In one exemplary embodiment, the publicly available source 140 publishes consolidated call reports that contain information on a plurality of institutions (e.g., FDIC and NCUA for financial institutions). The computer processing device 110 retrieves the information from the publicly available source 140 via the network 150 and stores the information in the extracted information database 122.

The client institution 130 is configured to communicate with the computer processing device 110 via network 150. The client institution 130 provides the computer processing device 110 with a list of employees and the area of responsibility for each employee on the list.

The computer processing device 110 creates a client questionnaire that is separated into a plurality of role categories. The plurality of role categories can include, for example, chief compliance officer, loan lead, deposit lead, advertising lead, and operations lead. The client questionnaire is then distributed to the client institution 130 with each employee on the list of employees receiving questions corresponding to the employee's area of responsibility. For example, the compliance officer of the client institution 130 will receive questions related of the chief compliance officer role category. It will be apparent to persons having skill in the relevant art that the role categories and distribution of the client questionnaire will vary depending on the client institution 130. For example, if the client institution 130 does not employ a compliance officer, then questions corresponding to the chief compliance officer role category may be distributed to a different employee, or split among multiple employees. The answers are then transmitted from the client institution 130 to the computer processing device 110, and are stored in the client questionnaire database 124.

The computer processing device 110 is also configured to locate data in the extracted information database 122 corresponding to the client institution 130. This located data gets stored in the client questionnaire database 124 alongside the questionnaire answers. In one embodiment, an interview with the client institution 130 is also conducted, and the resulting data is also stored in the client questionnaire database 124. The computer processing device 110 then makes an assessment of the risk that the client financial institution 130 will not be compliant with a set of regulations, based on the data in the client questionnaire database 124. Sets of regulations can include, for example, non-governmental regulations (e.g., self-imposed regulations) or governmental regulations (e.g., USA PATRIOT ACT regulations, or provisions of the Bank Secrecy Act, state, local, or other federal regulations), or nearly any other regulation, standard or best practice (whether self-imposed or otherwise).

In one embodiment, the assessed risk of the client institution 130 is represented by a risk rating value. The risk rating value is a representation of the compliance risk of a institution evaluated across a plurality of categories. In one embodiment, the categories are market environment, economic, political, technological, infrastructure, and personnel. In some embodiments, the relative risk of each of the categories is weighted in order to achieve an overall risk rating value. In one embodiment, market environment risk represents 20% of the risk rating value, economic risk represents 20%, political risk represents 20%, technological risk represents 20%, infrastructure risk represents 10%, and personnel risk represents 10%.

In one exemplary embodiment, in addition to overall risk weighing by category, the individual risk elements within a category are individually weighted. There can be individual risk factors in multiple categories, for example, in market environment (e.g., geographic region, competition factors, dominance in market) or in economic (e.g., earnings, delinquency, regulatory oversight). In one embodiment, because there can exist interrelationships among risk elements between categories, a multiplier is applied to recognize the interrelationships where appropriate. The multiplier can be mathematically quantified, e.g., if 3 of 7 risk factors are a 3 or higher on a 5 point scale, then a 1.2× multiplier is applied. It will be apparent to persons having skill in the relevant art(s) that specific factors may be given higher weighting due to their effect on compliance risk.

In one exemplary embodiment, the computer processing device 110 is also configured to create a set of policies and procedures necessary for the client institution 130 to adopt in order to achieve or maintain compliance with the set of regulations. The set of policies and procedures are stored in the client policy and procedures database 126 and made available to the client institution 130. In one embodiment, the set of policies and procedures is designed to be implemented over the course of one calendar year.

In one exemplary embodiment, the computer processing device 110 provides the client institution 130 with notifications of activities required to perform to achieve/maintain compliance in accordance with the set of policies and procedures. This is beneficial as it allows the client institution 130 to be aware of what is necessary to achieve or maintain compliance without the need of employing an outside provider or a full-time compliance employee to prepare and perform required activities. In one embodiment, the notifications are provided to specific employees of the client institution 130 based on their area of responsibility. Any media generated by the client institution 130 in performing the required activities is stored in client compliance database 128. The types of media generated will be apparent to persons having skill in the art(s), and can include, for example, compliance reports or documents generated by various types of transactions (e.g., loan agreements and other financial transactions, research papers, etc.).

In one exemplary embodiment, the computer processing device 110 evaluates the media stored in the client compliance database 128 for compliance with the set of regulations and provides compliance feedback to the client institution 130. In one embodiment, the computer processing device 110 updates the client questionnaire database 124 based on data obtained from analyzing the client compliance database 128. In other embodiments, the computer processing device 110 reassesses the compliance risk of the client institution 130 based on the updated client questionnaire database 124 and generates a new set of policies and procedures and updates the client policy and procedures database 126 accordingly. In one embodiment, the computer processing device 110 provides the client institution 130 with new notifications based on the updated client policy and procedures database 126. In one embodiment, this process is repeated continually to assist the client institution 130 in achieving and/or maintaining compliance with the set of regulations.

Figure 2:
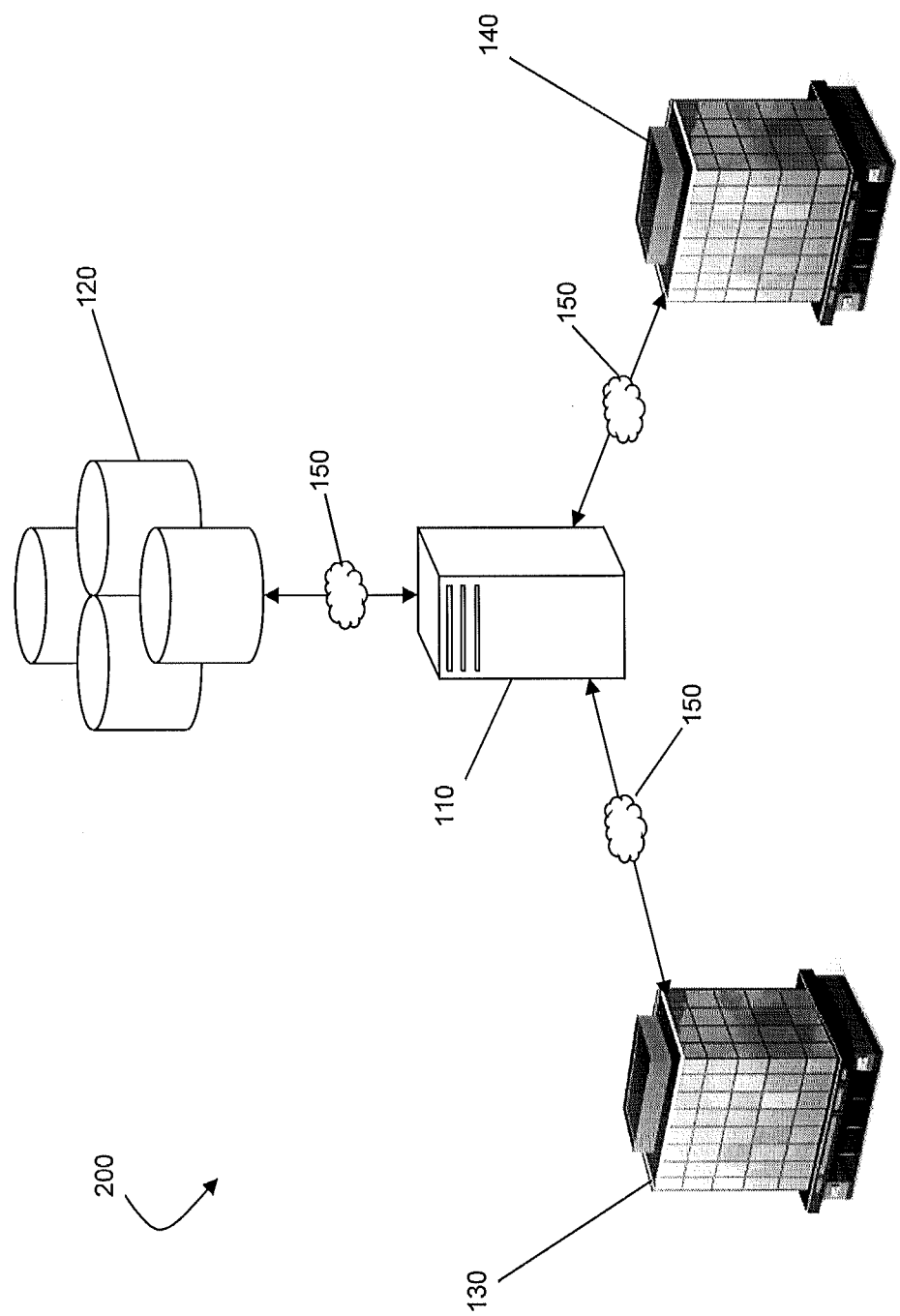
FIGS. 2 and 3 are block diagrams illustrating alternative embodiments of a system for assessing compliance risk consistent with the present disclosure.

FIG. 2 illustrates a block diagram of an additional exemplary embodiment of the system 100 for assessing compliance risk of an institution. In FIG. 2, the computer processing device 110 is connected to the plurality of databases 120 via the network 150.

Figure 3:
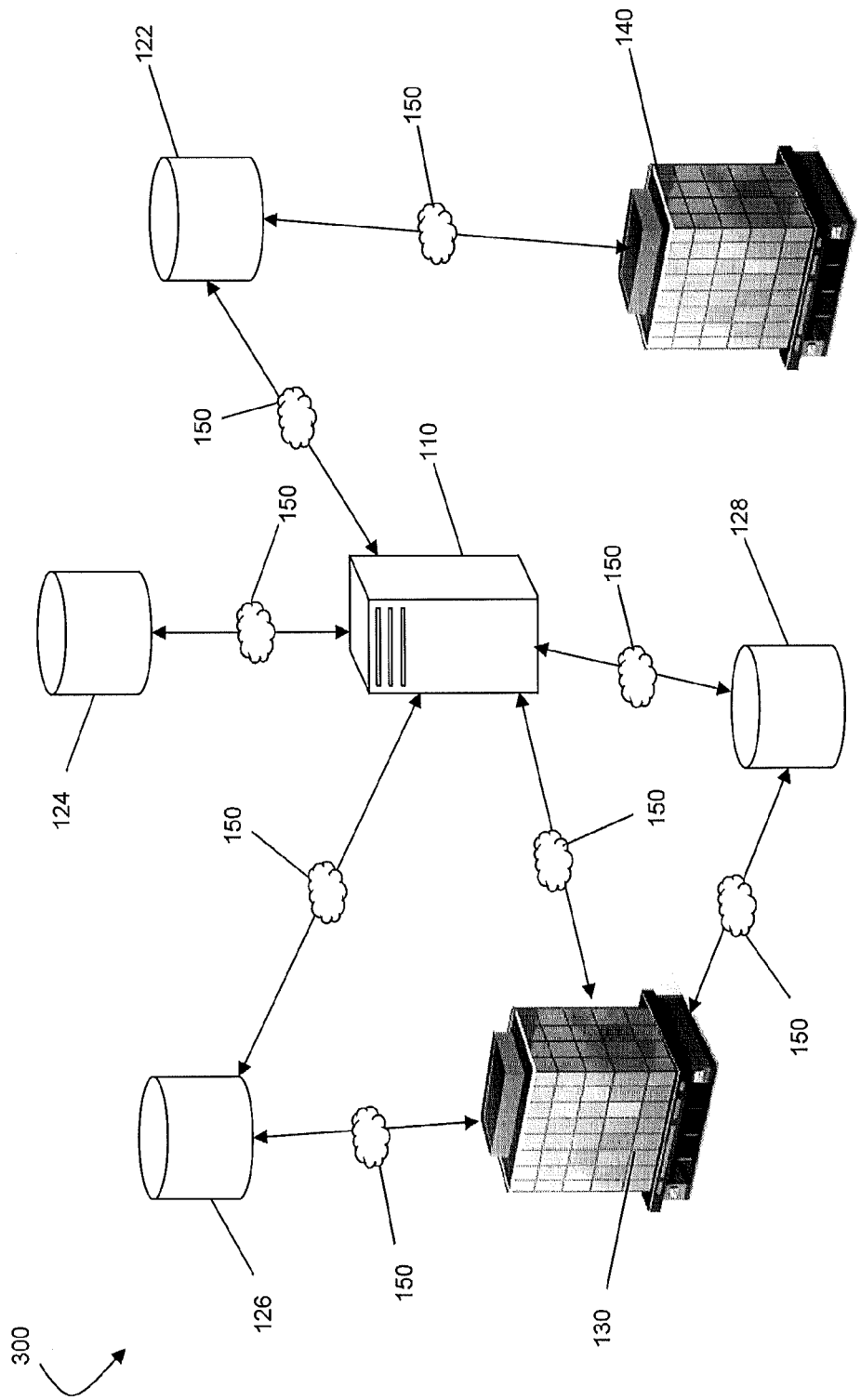

FIG. 3 illustrates a block diagram of another exemplary embodiment of the system 100 for assessing compliance risk of an institution. In FIG. 3, the system 300 for assessing compliance risk is implemented without the use of the plurality of databases 120. Instead, each of the databases are connected in the system 300 separately via the network 150. For example, the extracted information database 122 is connected to the computer processing device 110 and the publicly available source 140.

In the embodiment illustrated in FIG. 3, the client policy and procedures database 126 and the client compliance database 128 are each connected both to the computer processing device 110 and the client institution 130 via the network 150. In this embodiment, it allows for the client institution 130 to, for example, store generated media directly into the client compliance database 128, which can later be accessed by the computer processing device 110 to evaluate for compliance, all via the network 150. In one embodiment, this is implemented by cloud computing.

Figure 4:
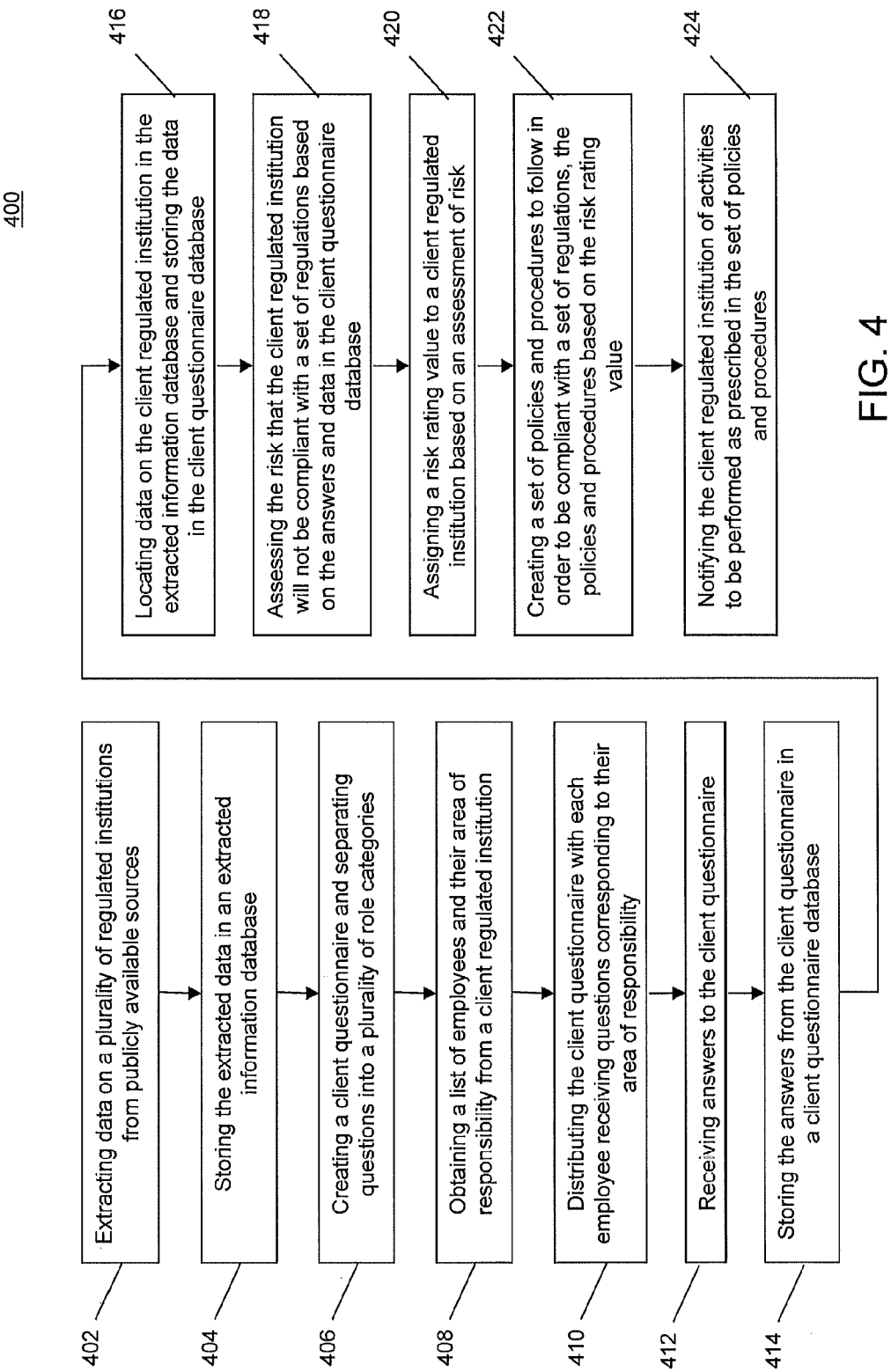
FIG. 4 is a flowchart illustrating a method for assessing compliance risk of a regulated institution according to an embodiment of the disclosed system.

FIG. 4 illustrates a flowchart of a method 400 of assessing compliance risk of a regulated institution.

In step 402, the computer processing device 110 of FIG. 1 extracts data on a plurality of institutions from the publicly available source 130. In one exemplary embodiment, the publicly available source is a regulatory agency. In step 404, the information is stored in the extracted information database 122.

In step 406, the computer processing device 110 creates a client questionnaire and separates questions into a plurality of role categories. In one embodiment, the plurality of role categories includes chief compliance officer, loan lead, deposit lead, advertising lead, and operations lead. In step 408, the computer processing device 110 obtains a list of employees and their area of responsibility from the client institution 130. In step 410, the computer processing device 110 distributes the client questionnaire to the client institution 130 with each employee receiving questions corresponding to their area of responsibility.

In step 412, the computer processing device 110 receives the answers to the client questionnaire and stores them, in step 414, in the client questionnaire database 124. Data on the client institution 130 is located, in step 416, in the extracted information database 122 and stored in the client questionnaire database 124. In step 418, the computer processing device 110 assesses the risk that the client institution 130 will not be compliant with a set of regulations based on the answers and data in the client questionnaire database 124. In some embodiments, the set of regulations are governmental based. For financial institutions, in one embodiment, the set of regulations is the USA Patriot Act and/or the Bank Secrecy Act. For food and drug companies, the set of regulations would include U.S. Food and Drug Agency (FDA) regulations and like agencies around the world. For health care providers, the regulations come from a variety of sources including The Centers for Medicare and Medicaid Services (CMS) for reimbursement.

In step 420, the computer processing device 110 assigns a risk rating value to the client institution 130 based on the assessed compliance risk. In some embodiments, the risk rating value is evaluated as a rating across a plurality of risk categories. In one embodiment, the plurality of risk categories includes market environment, economic, political, technological, infrastructure, and personnel risk. In one embodiment, each risk category includes a plurality of risk elements. In another embodiment, a multiplier is applied to weigh the plurality of risk elements.

In step 422, the computer processing device 110 creates a set of policies and procedures for the client institution 130, based on the institution's risk rating value, to follow to achieve or maintain compliance with the set of regulations and stores the set of policies and procedures in the client policy and procedures database 126. In step 424, the computer processing device 110 notifies the client institution 130 of activities to be performed as prescribed by the set of policies and procedures. In some embodiments, the notification is provided to employees of the client institution 130 based on their area of responsibility.

Figure 5:
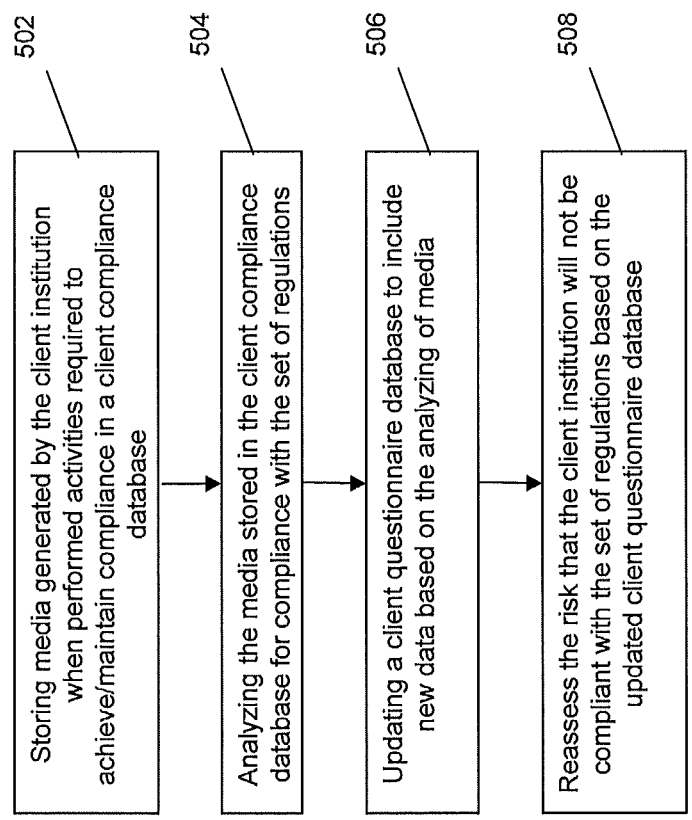
FIG. 5 is a flowchart illustrating additional features of the method for assessing compliance risk of FIG. 4 according to an embodiment.

FIG. 5 illustrates a flowchart of additional features to the method 400 for assessing compliance risk of a regulated institution.

In step 502, any media that is generated by the performance activities required to achieve/maintain compliance is stored in the client compliance database 128. The stored media is analyzed, in step 504, for compliance with the set of regulations.

In step 506, the computer processing device 110 updates the data in the client questionnaire database 124 to include data based on the analyzing performed in step 510. Then, in step 514, the computer processing device 110 reassesses the compliance risk of the client institution 130 using the updated client questionnaire database 124. In one embodiment, after reassessing the risk, steps 502 to 514 are repeated.

Where methods described above indicate certain events occurring in certain orders, the ordering of certain events may be modified. Moreover, while a process depicted as a flowchart, block diagram, etc. may describe the operations of the system in a sequential manner, it should be understood that many of the system's operations can occur concurrently. For example, although the computer processing device 110 is disclosed and illustrated (e.g., in FIG. 3) as being configured to receiving and store answers to the client questionnaire prior to locating and storing data extracted from the extracted information database, in some embodiments, the computer processing device 110 can first locate and store the extracted data prior to receiving and storing the answers to the client questionnaire. In other embodiments, the computer processing device 110 can concurrently receive and store both the extracted data and the answers to the client questionnaire.

Social Networking

In some embodiments, the computer processing device 110 of the system 100 may be configured to provide a social network for client institutions (e.g., the client regulated institution 130). Methods and systems suitable for operating and maintaining a social network will be apparent to persons having skill in the relevant art and may include various web hosting servers operated by or on behalf of the computer processing device 110 and databases, which may be included in the plurality of databases 120. For example, the computer processing device 110 may maintain (e.g., or a third party may maintain on behalf of the computer processing device 110) a website where client institutions 130 may register and connect with other client institutions in the same regulated industry.

The website may include blogs, message boards or forums, or other socially networked features as will be apparent to persons having skill in the relevant art. For example, the website may include a list of regulators or regulatory agencies (e.g., which may be created and/or maintained by the client processing device 110 or by the registered client institutions 130). The client institutions 130 that work with the respective regulators or regulatory agencies may post or share information with other institutions, such as tips or advice regarding compliance and the individual personalities of the specific regulators or agencies. For example, a client institution 130 may share that a specific regulator emphasizes a particular regulation and has a unique style for review of compliance of the regulation, which information may be used by another institution to ensure compliance.

In some embodiments, the computer processing device 110 may mine information in the social network as provided by the client institutions 130, which may be used to improve the sets of policies and procedures created and provided to the client regulated institutions 130. In such an instance, individual client institutions 130 would not need to go through every post in the social network as they could be confident that any useful information provided by other institutions would be taken into account when their set of policies and procedures to follow is created.

Additional features that may be included in the social network will be apparent to persons having skill in the relevant art. For example, each regulated industry may have a social network unique to that industry, or subpart of an industry demarked in any manner, such as geographically or by zones (geographic or otherwise) of authority or responsibility of an regulatory agency or agencies. In some instances, there may be a separate social network for each regulatory agency or set of regulations. For example, there may be a national or state credit union network, or a drug manufacturer network in a particular country or state. In some embodiments, the social network may be controlled by the institutions themselves, such as an association created or populated by institutions in the regulated industry and/or area.

It will be apparent to persons having skill in the relevant art that the system 100 and method 400 may be used for assessing compliance risk for an institution in any industry that is heavily regulated. In an exemplary embodiment, the regulations may be set forth by multiple regulatory agencies. Such industries may include the financial industry, where the client regulated institution may be a bank, credit union, etc. Other industries may include the pharmaceutical or medical industry, such as a pharmaceutical research company or a medical testing laboratory. Institutions that contract with the federal government, such as defense contractors, etc., may also benefit from the system 100 in order to comply with numerous regulations set forth by the government and other agencies.

Additional industries will be apparent to persons having skill in the art, such as the insurance industry (e.g., for certified life underwriting institutions).

Furthermore, while the system 100 may be useful for creating policies and procedures for client institutions to maintain compliance with regulations, it will be apparent to persons having skill in the relevant art that the system 100 may also be used for other services related to regulation, such as reimbursement from regulatory or government agencies. For example, a client medical institution may be provided with instructions and/or guidance for being reimbursed for providing Medicare services by the Center for Medicare & Medicaid Services (CMS), or for modifying business practices to further facilitate compliance or an increase in reimbursement.

The system 100 may be beneficial for smaller institutions, such as locally owned small businesses that may not be able to afford to employ compliance personnel. The system 100 may also be beneficial for larger institutions that, although they can afford to employ compliance personnel, may have a staggering amount of information to review and process in addition to extra or stricter regulations, which may take a significant amount of time even for full-time compliance personnel. The computer processing device 110 and the created set of policies and procedures may be beneficial for saving both small and larger regulated institutions time and expense when maintaining compliance with regulations. In some instances, the computer processing device 110 may be able to provide assistance to the client institution 130 such that it may improve their compliance practice from spending 80% of time looking for compliance issues and 20% of the time fixing any issues, to spending only 20% of the time looking for issues and 80% of the time fixing and/or improving compliance. Furthermore, the review and assistance of an independent party (e.g., the computer processing device 110) may provide additional protection against fraud in instances where an employee of the client institution 130 may not be able to detect compliance issues.

Techniques consistent with the present disclosure provide, among other features, a system and method of assessing compliance risk of a regulated institution. While various exemplary embodiments of the disclosed system and method have been described above, it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope. The scope of the invention is defined by the claims and their equivalents.

What is claimed is:

1. A method for assessing compliance risk of regulated institutions, comprising:
    extracting, by a computer processing device, data on a plurality of regulated institutions from at least one publicly available source;
    storing, in an extracted information database, the extracted data;
    receiving, by the computer processing device, an employee list from a client regulated institution, wherein the employee list includes a plurality of employees and an area of responsibility associated with each employee of the plurality of employees;
    creating, by the computer processing device, a client questionnaire based on the data stored in the extracted information database, wherein the client questionnaire includes questions associated with at least one of a plurality of role categories, each role category of the plurality of role categories corresponding to an area of responsibility;
    distributing the client questionnaire to each employee of the plurality of employees, wherein each employee receives questions associated with a role category corresponding to the area of responsibility associated with the employee;
    receiving, by the computer processing device, answers to the questions distributed in the client questionnaire;
    storing, in a client questionnaire database, the received answers;
    identifying, in the extracted information database, data corresponding to the client regulated institution;
    storing, in the client questionnaire database, the identified data corresponding to the client regulated institution;
    assessing, by the processing device, the risk that the client regulated institution will not be compliant with a set of regulations based on the answers and data stored in the client questionnaire database;
    identifying, by the computer processing device, a risk rating value to be associated with the client regulated institution based on the assessed risk; and
    transmitting at least one notification to the client regulated institution, wherein the notification includes activities the client regulated institution is required to perform as prescribed by the set of regulations based on the associated risk rating value.

2. The method of claim 1, further comprising;
    storing any media generated by the client regulated institution when performing the prescribed activities in a client compliance database; and
    analyzing, by the processing device, the media stored in the client compliance database for compliance with the set of regulations.

3. The method of claim 2, further comprising:
    updating, by the processing device, the client questionnaire database to include new data, wherein the new data is data obtained from performing the analyzing step;
    repeating the assessing and creating steps after performing the updating step; and
    transmitting at least one notification to the client financial institution of updates to the activities to be performed as a result of the repeating step.

4. The method of claim 1, wherein the risk rating value reflects a relative risk weighing of a plurality of risk categories.

5. The method of claim 4, wherein the plurality of risk categories are impacted by at least one factor including: market environment, economic, political, technological, infrastructure, prior review, self-assessment questionnaire, and personnel risk.

6. The method of claim 4, wherein each of the plurality of risk categories includes a plurality of individual risk elements.

7. The method of claim 1, wherein transmitting the at least one notification to the client regulated institution includes transmitting a notification to each employee including activities the employee is required to perform or a request for additional review based on the area of responsibility associated with the employee.

8. The method of claim 1, wherein the client regulated institution is a financial institution.

9. A method for assessing compliance risk of regulated institutions, comprising:

extracting, a computer processing device, data on a plurality of regulated institutions from at least one publicly available source;

storing, in an extracted information database, the extracted data;

receiving, by the computer processing device, an employee list from a client regulated institution, wherein the employee list includes a plurality of employees and an area of responsibility associated with each employee of the plurality of employees;

creating, by the processing device, a client questionnaire based on the data stored in the extracted information database, wherein the client questionnaire includes questions associated with at least one of a plurality of role categories, each role category of the plurality of role categories corresponding to an area of responsibility;

distributing the client questionnaire to each employee of the plurality of employees, wherein each employee receives questions associated with a role category corresponding to the area of responsibility associated with the employee;

receiving, by the computer processing device, answers to the questions distributed in the client questionnaire;

storing, in a client questionnaire database, the received answers;

identifying, in the extracted information database, data corresponding to the client regulated institution;

storing, in the client questionnaire database, the identified data corresponding to the client regulated institution; and assessing, by the processing device, the risk that the client regulated institution will not be compliant with a set of regulations based on the answers and data stored in the client questionnaire database.

10. The method of claim 9, wherein the client regulated institution is a financial institution.

11. A system for assessing compliance risk of a regulated institution, comprising:

a client questionnaire database;

a computer processing device configured to extract data on a plurality of regulated institutions from at least one publicly available source, wherein the computer processing device is further configured to receive an employee list from a client regulated institution, wherein the employee list includes a plurality of employees and an area of responsibility associated with each employee of the plurality of employees; and wherein computer processing device further configured to identify, from the extracted data, data corresponding to a client regulated institution, store, in the client questionnaire database, the identified data corresponding to the client financial institution, and generate a client questionnaire, wherein the client questionnaire includes questions associated with at least one of a plurality of role categories, each role category of the plurality of role categories corresponding to an area of responsibility; and, the computer processing device configured to distribute through a network the client questionnaire to each employee of the plurality of employees, wherein each employee receives questions associated with a role category that corresponds to the area of responsibility associated with the employee, wherein the computer processing device is further configured to receive answers to the questions distributed in the client questionnaire, and the computer processing device is further configured to store the received answers in the client questionnaire database, and assess the risk that the client regulated institution will not be compliant with a set of regulations based on the answers and data in the client questionnaire database.

12. The system of claim 11, wherein the computer processing device is further configured to identify a risk rating value to be associated with each of the plurality of role categories of the client regulated institution based on the assessed risk.

13. The system of claim 12, wherein the risk rating value reflects a relative risk weighing of a plurality of risk categories.

14. The system of claim 13, wherein the plurality of risk categories are impacted by at least one factor including: market environment, economic, political, technological, infrastructure, prior review, self-assessment questionnaire, and personnel risk.

15. The system of claim 13, wherein each of the plurality of risk categories includes a plurality of individual risk elements.

16. The system of claim 12, wherein the computer processing device is further configured to create a set of procedures to follow to achieve and/or maintain compliance with the set of regulations, wherein the set of procedures is based on the risk rating value of the client financial institution.

17. The system of claim 16, wherein the transmitting device is further configured to transmit at least one notification to the client regulated institution, wherein the at least one notification includes activities the client regulated institution is required to perform as prescribed by the set of procedures.

18. The system of claim 17, wherein the computer processing device is further configured to store any media generated by the client financial institution when performing the prescribed activities in a client compliance database, and analyze the media stored in the client compliance database for compliance with the set of regulations.

19. The system of claim 18, wherein the computer processing device is further configured to update the client questionnaire database to include new data obtained by analyzing the media stored in the client compliance database.

20. The system of claim 17, wherein transmitting the at least one notification to the client regulated institution includes transmitting a notification to each employee including activities the employee is required to perform or a request for additional review based on the area of responsibility associated with the employee.

21. The method of claim 1, further comprising:

creating a set of procedures for the client regulated institution to follow to achieve and/or maintain compliance with the set of regulations, wherein the set of procedures is based on the identified risk rating value.

22. The method of claim 21, wherein the set of procedures includes a request for additional information to be provided for ongoing review.

23. The system of claim 16, wherein the set of procedures includes a request for additional information to be provided for ongoing review.

24. The method of claim 1, wherein identifying a risk rating value to be associated with the client regulated institution further includes identifying a risk rating value to be associated with each of the plurality of role categories of the client regulated institution.

\* \* \* \* \*